(12) United States Patent
Tibbles et al.

(10) Patent No.: US 6,638,896 B1
(45) Date of Patent: *Oct. 28, 2003

(54) FLUIDS AND TECHNIQUES FOR HYDROCARBON WELL COMPLETION

(75) Inventors: Raymond J. Tibbles, Youngsville, LA (US); Mehmet Parlar, Broussard, LA (US); Frank F. Chang, Sugar Land, TX (US); Diankui Fu, Missouri City, TX (US); Jonathan Mark Davison, Torphins (GB); Elizabeth W. A. Morris, Aberdeen (GB); Antje M. Wierenga, Houston, TX (US); Palathinkara S. Vinod, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/651,059

(22) Filed: Aug. 30, 2000

Related U.S. Application Data

(62) Division of application No. 09/224,440, filed on Dec. 31, 1998, now Pat. No. 6,140,277.

(51) Int. Cl.$^7$ .............................. C09K 7/02; E21B 21/00
(52) U.S. Cl. ........................ 507/201; 507/101; 507/239; 507/240; 166/270.1; 166/271; 166/308
(58) Field of Search ................................ 507/101, 201, 507/239, 240; 166/270.1, 271

(56) References Cited

U.S. PATENT DOCUMENTS

| 4,081,030 | A | * | 3/1978 | Carpenter et al. | ........... 166/276 |
|---|---|---|---|---|---|
| 4,430,128 | A | | 2/1984 | Frenier et al. | ................. 134/3 |
| 4,591,447 | A | * | 5/1986 | Kubala | ........................ 507/240 |
| 4,615,825 | A | | 10/1986 | Teot et al. | ................... 252/356 |
| 4,623,399 | A | | 11/1986 | Frenier | ........................... 134/3 |
| 4,636,327 | A | | 1/1987 | Frenier et al. | ................ 252/87 |
| 4,888,121 | A | | 12/1989 | Dill et al. | ................ 252/8.553 |
| 5,224,546 | A | * | 7/1993 | Smith et al. | ................. 166/300 |
| 5,247,995 | A | * | 9/1993 | Tjon-Joe-Pin et al. | ...... 166/300 |
| 5,258,137 | A | * | 11/1993 | Bonekamp et al. | ........... 516/11 |
| 5,881,813 | A | * | 3/1999 | Brannon et al. | ............ 166/304 |
| 5,972,868 | A | | 10/1999 | Athey et al. | ................ 510/247 |
| 6,035,936 | A | * | 3/2000 | Whalen | ..................... 166/308 |
| 6,263,967 | B1 | * | 7/2001 | Morris et al. | ................ 166/312 |

FOREIGN PATENT DOCUMENTS

WO          98/56497        12/1998

* cited by examiner

*Primary Examiner*—Jill Warden
*Assistant Examiner*—LaToya Cross
(74) *Attorney, Agent, or Firm*—Robin Nava; Catherine Menes; Brigitte Jeffery

(57) ABSTRACT

The Invention relates to fluids and techniques to optimize/enhance the production of hydrocarbon from subterranean formations (e.g., "completion fluids"), in particular, fluids and techniques are. disclosed and claimed which remove wellbore damage and near-wellbore damage in the form of coating formed from drilling and production-related operations ("filtercake"); the techniques can be applied either by themselves or in conjunction with other completion operations, such as gravel packing; preferred embodiments are chelating agent and enzyme systems in a viscoelastic surfactant (VES) matrix.

16 Claims, 14 Drawing Sheets

FLUIDS AND TECHNIQUES FOR HYDROCARBON WELL COMPLETION

This is a division of application Ser. No. 09/224,440 filed Dec. 31, 1998 now U.S. Pat. No. 6,140,277.

TECHNICAL FIELD OF THE INVENTION

The Invention relates to novel fluids and techniques to optimize/enhance the production of hydrocarbon from subterranean formations, in particular, fluids and techniques are disclosed and claimed which remove wellbore and near-wellbore formation damage in the form of coating formed from drilling and production-related operations; the techniques can be applied either by themselves or in conjunction with other completion operations, such as gravel packing.

BACKGROUND OF THE INVENTION

The present Invention relates to novel fluids and techniques to optimize/enhance the production of hydrocarbons from subterranean formations. To recover hydrocarbons (e.g., oil, natural gas) it is of course necessary to drill a hole in the subsurface to contact the hydrocarbon-bearing formation. This way, hydrocarbons can flow from the formation, into the wellbore and to the surface. Recovery of hydrocarbons from a subterranean formation is known as "production." One key parameter that influences the rate of production is the permeability of the formation along the flowpath that the hydrocarbon must travel to reach the wellbore. Sometimes, the formation rock has a naturally low permeability, other times, the permeability is reduced during, for instance, drilling the well. When a well is drilled, a fluid is circulated into the hole to contact the region of the drill bit, for a number of reasons—including, to cool the drill bit, to carry the rock cuttings away from the point of drilling, and to maintain a hydrostatic pressure on the formation wall to prevent production during drilling.

Drilling fluid is expensive particularly in light of the enormous quantities that must be used during drilling. Additionally, drilling fluid can be lost by leaking off into the formation. To prevent this, the drilling fluid is often intentionally modified so that a small amount leaks off and forms a coating on the wellbore, or a "filtercake."

Yet once drilling is complete, and production is desired, then this coating or filtercake must be removed. The present fluids and techniques are directed to removing this filtercake or other such damage in the wellbore and near-wellbore region, that results either intentionally (in the case of drilling fluid) or unintentionally (in the case of scale deposits from produced water or dewatered fluids from workover/stimulation operations performed on the well).

Conventional treatments for removing filtercake include: aqueous solution with an oxidizer (such as persulfate), hydrochoric acid solution, organic (acetic, formic) acid, combination of acid and oxidizer, and aqueous solutions containing enzymes. For instance, the use of enzymes to remove filtercake is disclosed in U.S. Pat. No. 4,169,818, Mixture of Hydroxypropylcellulose and Poly(Maleic Anhydride/Alkyl Vinyl Ether) as a Hydrocolloid Gelling Agent (1979) (col. 1, ln. 42); U.S. Pat. No. 3,515,667, Drilling Fluid Additive (1970); U.S. Pat. No. 3,509,950, Well Drilling Mud and Screen Composition of Use Thereof U.S. Pat. No. 2,259,419, Well Drilling (1941). Chelating agents (e.g., EDTA) are also used to promote the dissolution of calcium carbonate. See, C. N. Fredd and H. S. Fogler, Chelating Agents as Effective Matrix Stimulation Fluids for Carbonate Formations, SPE 372212 (1997); C. N. Fredd and H. S. Fogler, Alternative Stimulation Fluids and Their Impact on Carbonate Acidizing, SPE 31074 (1996), both articles are hereby incorporated by reference in their entirety. According to conventional teaching, the oxidizer and enzyme attack the polymer fraction of the filtercake; the acids mainly attack the carbonate fraction (and other minerals). Generally speaking, oxidizers and enzymes are ineffective in degrading the carbonate fraction; likewise, acids have very little effect on polymer.

In addition, numerous problems plague conventional techniques of filtercake removal. Perhaps the most troublesome is the issue of "placement." For instance, one common component in filtercake is calcium carbonate. The substance of choice to remove calcium carbonate is hydrochloric acid. Hydrochloric acid reacts very quickly with calcium carbonate. What happens then, is that the filtercake begins to dissolve, therefore dramatically increasing the permeability of the wellbore face, so that the wellbore region is no longer "sealed off" from the formation. Once this happens, the entire clean-up fluid may then leak off into the formation through this zone of increased permeability ("thief zones," or discrete zones within the interval of very high permeability where more filtercake dissolution has occurred than at other places along the interval).

A second problem with removal of filtercake is that it is comprised of several substances, and which are, as mentioned earlier, not generally removable with a single substance. Calcium carbonate and organic polymers (e.g., starch and other polysaccharide) are two primary constituents of conventional drilling fluids that form a filtercake on the wellbore. Treating these successively—i.e., with two different fluids, one after the other—is problematic since, it requires at least two separate treatments. Combining two different breakers (one for the polymer fraction, one for calcite) is problematic since each has a distinct activity profile (or optimal window of activity, based on temperature, pH, etc.) and the activity profiles of two different breakers may not coincide. This is particularly likely if one of the breakers is an enzyme, which are notoriously temperature and pH sensitive.

Moreover, if the calcium carbonate is removed first—as it often is—then, once the hydrochloric acid contacts the filtercake, regions of higher permeability are created in the wellbore (where the filtercake has dissolved). Hence, fluid will leak-off into the formation during subsequent phases of the filter-cake removal treatment.

Hence, the ideal fluid must be easy to "spot" or place in wellbore over the entire length of the desired zone, contiguous with the producing zone (e.g., a two thousand foot horizontal zone)—before any filtercake dissolution occurs. If the fluid begins to dissolve the filtercake too quickly, then the fluid will be lost through the thief zones and the entire fluid treatment will be destroyed. In other words, a hypothetical ideal fluid would be completely unreactive for a period of time to enable it to be spotted along the entire length of the producing interval, then, once in place, react sufficiently slowly and uniformly, so that no thief zones are. Again, if thief zones form, then the entire mass of fluid can leak off through that zone. Hence, reasonably uniform/controlled dissolution is necessary to ensure that the fluid remains in contact with the filtercake along the entire interval until near-complete dissolution of the filtercake has occured along the entire interval.

Moreover, removing filtercake is an expensive and time-consuming procedure. Therefore, it is desirable to do this at the same time that another treatment is being performed, if possible. For instance, if a material must be delivered to one portion of the formation into the wellbore (e.g., in conjunction with a remedial treatment), then the fluid used to carry that material can be an acid solution which will also dissolve portions of the filtercake. Again, if the carrier fluid leaks off into the formation through a thief zone, then the remedial operation is completely destroyed.

One common treatment performed on wells, particularly wells in the Gulf Coast region of the United States, is known as a "gravel pack." Gravel pack operations are performed to prevent the production of sand along with hydrocarbon, which often occurs in formations of weakly consolidated sands. To prevent sand production, a filter (or screen) can be placed around the portion of the wellbore in which production occurs. A more long-term solution for sand control is achieved if the region between the screen and the formation is filled with gravel, which is properly sized to prevent the sand from moving through the gravel and into the wellbore—to function as a filter—so that when the sand tries to move through the gravel, it is filtered and held by the gravel or screen, but hydrocarbon continues to flow unhindered (by either the gravel or screen) into the wellbore.

Again, it would be highly advantageous if the fluid used to deliver the gravel could also be used to dissolve the filtercake, which would eliminate the need for a separate treatment just to dissolve the filtercake. This would result in substantial cost savings—both because a separate treatment is costly, and because it take additional time to perform such a treatment.

Thus, what is desired is a fluid that can be used as a carrier fluid (though it need not be used for that purpose) and that can also degrade the filtercake. An ideal carrier fluid is inert—i.e., it should not degrade the filtercake instantaneously (otherwise the fluid can be lost into the formation)—but an ideal filtercake dissolution fluid must dissolve the cake, eventually. Therefore, an ideal fluid must somehow combine these two contradictory attributes.

Indeed, the need for filtercake clean-up is particularly acute in gravel pack completions—i.e., wells in which the movement of sand along with the hydrocarbon is prevented by a gravel pack/screen combination—because, the entrapment of the filter-cake between the formation and screens or gravel can result in substantial reduction in production. The need for a reliable filtercake clean-up treatment with a good diversion mechanism (to ensure proper placement) is also particularly acute in horizontal, or highly deviated wells. In these cases, the producing interval may be several thousand feet, compared with a vertical well, which may have a producing zone of about 30 feet. Because the difficulty of placing a mass or fluid to achieve near-uniform dissolution over 1000 feet interval is far greater than for a 30 feet interval—placement takes longer, and the potential for the creation of thief zones is far greater.

Therefore, an urgent need exists in the drilling and completions sector for a reliable fluid for degrading filtercake—quickly, efficiently, and completely, and which can be used as a carrier fluid in conjunction with other completion/workover/stimulation operations. This is the primary objective of the present Invention.

SUMMARY OF THE INVENTION

The present Invention relates to fluids intend to break filtercake (whether produced from drilling, production, completion, workover, or stimulation activity, either produced intentionally or unintentionally. In particularly preferred embodiments, the fluids and techniques are directed to degrading (or "breaking") filtercake formed from starch/carbonate-containing drilling fluid such as the STAR-DRILL™ (a drill-in fluid manufactured and sold by Schlumberger). In other particularly preferred embodiments, the fluids of the present Invention are operable in conjunction with a gravel pack operation, and in particular, though not exclusively, to break filtercake, in conjunction with a gravel pack operation.

Therefore, one object of the present Invention is to provide novel completion fluids to break filtercake, either alone or in conjunction with other workover/completion/stimulation treatments, but in particular, gravel pack operations. Preferred embodiments relate to fluids to break filtercake having substantial calcite and starch content. Particularly preferred embodiments relates to treatment fluids having two essential components: a chelating agent and an enzyme. These components were selected based on their ability to dissolve different components of the filtercake, and based on their ability to dissolve these components at particular rates relative to one another. Other particularly preferred embodiments are fluids having these two components in a VES (viscoelastic surfactant) system. VES systems have numerous advantages—discussed at length in U.S. Patents incorporated by reference below—including that they are readily gelled, they can be disposed of more easily than guar and modified guar systems, they are more readily removed from subsurface formations. In addition, and of particular importance of the present Invention, VES systems create very low friction pressures compared with conventional carrier fluids, and therefore they are particularly preferred, for instance, in gravel pack operations of the present Invention.

The fluids of the present Invention can be successfully spotted or placed over, for instance, a 2000 ft. horizontal producing zone—without substantial leakoff. Particularly preferred embodiments to achieve this incorporate Mobil's AllPAC™ (licensed exclusively to Schlumberger). This way, the gravel pack operation, for instance, can take place without fluid loss.

At the same time, the fluid of the present Invention acts slowly upon the filtercake, to slowly but steadily dissolve it, but not before the particular workover operation has been completed.

Moreover, the break time (or time to substantial dissolution of the filtercake) of the fluids of the present Invention are optimized so that the overall or blended dissolution rate is very slow at low temperatures but much higher at high temperatures. The primary advantage of this unique temperature-dependence is that fluid can be introduced into the entire zone of interest before filtercake dissolution occurs, then as the fluid temperature rises due to contact with the wellbore, only then does dissolution occur.

The fluids and techniques of the present Invention are quite general and are operable in a variety of settings. These include, but are not limited to, screen-only completions and gravel pack completions; open hole and cased hole; vertical and highly deviated wells; single-application soak or circulating fluid in which the treatment fluid (of the present Invention) also serves as a carrier fluid for, e.g., a gravel pack operation; in conjunction with a gelling agent or viscoelastic surfactant (e.g., ClearFRAC™) or alone, and with a variety of clean-up tools. In summary, since the problem of placement and uniform dissolution are present in virtually every instance, the fluids and techniques of the present Invention are readily applicable to any scenario in which it is desirable to remove filtercake from the wellbore or near-wellbore region in the formation, regardless of whether the filtercake was produced during drilling or during other post-drilling operations (e.g., fluid-loss control pill, gravel pack operation, fracturing, matrix acidizing, and so forth).

Finally, the fluids of the present Invention are a viable, cost-effective replacement for HCl-based fluids, conventional fluids of choice to remove filtercake. Perhaps the major problem with HCl systems (aside from their ineffectiveness in removing the carbonate fraction of filtercake) is corrosion—corrosion of the above-ground storage tanks, pumps, down-hole tubulars used to place the fluid, and wellbore casings. Moreover, a cost-effective solution to corrosion is not readily available, as evidenced by the fact that corrosion inhibitors is a significant portion of the total expense of a filtercake remove (or matrix-acidizing) treatment. With many of the fluids of the present Invention (those that do not contain acid) the problem of corrosion is drastically minimized. Additionally, personnel safety and environmental concerns are significantly reduced with the fluids of the present Invention.

DETAILED DESCRIPTION OF THE PREFERRED EMBODIMENTS

Figure 1:
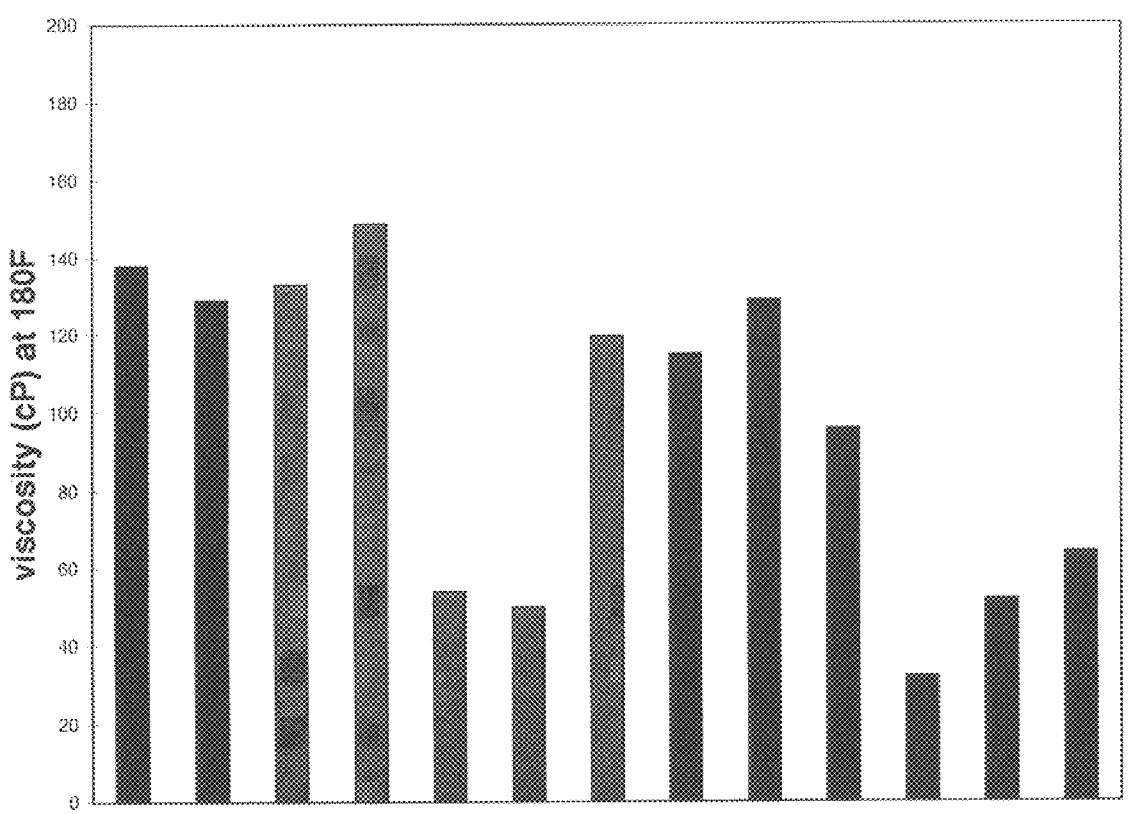
FIG. 1 shows change in viscosity of various VES solutions at 100 sec$^{-1}$ after 101 minutes at 180° F., upon addition of $K_2$-EDTA, α-amylase, ammonium persulfate—either separately or in combination. These data show for instance, that the viscosity of VES is not significantly affected by the addition of 0.5% α-amylase, nor is it affected by the addition of 0.5% α-amylase and 28% $K_2$-EDTA.

Again, the center of gravity, though not the exclusive scope, of the resent Invention, is a set of fluid compositions and techniques for removing de-watered drilling fluid (i.e., "filtercake"). In general, fluids which perform this function are referred to as "completion fluids." The common denominator of preferred embodiments (completion fluids) of the present Invention is they are specifically, though not exclusively, optimized to degrade/remove drilling filtercake produced from a certain kind of drilling fluid—a drill-in fluid system, known by the trademark, STARDRILL™. Primary components of STARDRILL are calcite, starch, and lesser concentrations of either xanthan or scleroglucan.

The fluids of the present Invention were designed based on numerous criteria, two primary criteria are: (1) rheology, i.e., ensuring that the fluid rheology at bottom hole circulating temperature fell with acceptable limits (e.g., sufficient viscosity to deliver gravel) over a wide shear rate range; and (2) clean-up, i.e., ensuring that the formulations were effective at removing filtercake while minimizing damage to the formation and not unduly interfering with a contemporaneous completion (e.g., gravel pack).

In addition, any system design that combines an enzyme and other breakers must account for the variable activity windows of the different breakers, particularly since some enzymes are highly pH and temperature sensitive.

EXAMPLE 1

Stability of VES Systems in the Presence of Breakers

Again, one object of the present Invention is to provide novel fluids that will degrade filtercake and which can also serve as carrier fluids in conjunction with other well treatments, particularly, gravel pack operations. In the case of gravel pack operations, the carrier fluid must be viscous in order to transport the gravel. Thus, VES systems are preferred. Again, VES stands for "viscoelastic surfactant." The use of VES for well treatment fluids has validated in numerous actual well treatments. Well treatment fluids based on VES are the subject of numerous patents and patent applications, each assigned to Schlumberger, and incorporated by reference in its entirety. U.S. Pat. No. 5,258,137, Viscoelastic Surfactant Based Foam Fluids, assigned to Schlumberger Technology Corporation, 1993; U.S. Pat. No. 5,551,516, Hydraulic Fracturing Process and Compositions, Schlumberger Technology Corporation, 1996; U.S. patent application Ser. No. 08/727,877, Methods of Fracturing Subterranean Formations, assigned to Schlumberger Technology Corporation, filed Oct. 9, 1996; U.S. patent application Ser. No. 08/865,137, Methods for Limiting the Inflow of Formation Water and for Stimulating Subterranean Formations, assigned to Schlumberger Technology Corporation, filed May 29, 1997; U.S. patent application Ser. No. 09/166,658, Methods of Fracturing Subterranean Formations, assigned to Schlumberger Technology Corporation, filed Oct. 5, 1998.

In the Examples that follow the VES system most often used is N-cis-13-docosenoic-N,N,-bis(2-hydroxymethyl)-N-methyl ammonium chloride (a.k.a. N-erucyl-N,N-bis(2-hydroxyethyl)-N-methyl ammonium chloride). In addition, the actual VES system used in the Examples contains 25% iso-propanol to enhance VES stability at low temperatures. In some instances, a second VES system is used, referred to as $VES_1$, and which consists of glyceryl esters of three different fatty acids, 23.5% erucyl ($C_{22}$ with one double bond), 32% oleic ($C_{18}$ with one double bond) and 44.5% linoleic ($C_{18}$ with three double bonds separated by methylene groups) acids.

In addition, the VES systems referenced above are fully compatible with seawater in addition to ordinary tap water. Thus, the term "VES" subsumes VES systems prepared from seawater in addition to freshwater. VES systems prepared from seawater are disclosed and claimed in U.S. patent application Ser. No. 09/166,658, Methods of Fracturing Subterranean Formations, filed Oct. 10, 1998, and assigned to Schlumberger. This application is hereby incorporated by reference in its entirety, and particularly with respect to that portion disclosing the operability of VES systems prepared from seawater.

The experimental results that follow illustrate that VES systems retain their stability (viscosity) upon addition of the breakers (either alone or in combination) of the present Invention.

The following experimental protocol was observed for the data collected and presented in the Examples that follow. First a dry sandstone core was weighed, then saturated with brine (to water wet the core) and then weighed again. Based on comparison of these two measurements, a pore volume was determined. Next, the core was heated to test temperature (150° F.). Then, 100 pore volumes of kerosene was flowed through the filtercake core, at about 10 psi. The purpose of this step is to fill the pores with hydrocarbon. The sandstone core's permeability to kerosene was then observed. Next, the kerosene is poured off, then 125 ml of STARDRILL drilling fluid was applied to the core under a pressure of 300 psi for about one hour. The goal is simulate overbalanced conditions within a typical wellbore; hence, the STARDRILL fluid was "forced" into the core to mimic leakoff. After one hour, the excess STARDRILL was poured off, and the core was rinsed with brine.

Next, the STARDRILL filtercake-coated core was contacted with a series of "clean-up" solutions—100 ml, at 300 psi for 2 hours (to simulate, e.g., a typical gravel pack operation). In the case of the data presented in FIG. 14, for instance, each clean-up solution consisted of a matrix of 5% VES in 3% $NH_4Cl$. These solutions are (from left to right in FIG. 14: "backflow" (to simulate allowing the well to produce without any clean-up "blank" (VES only), 28% $K_2$-EDTA; 14% $K_2$-EDTA; 28% $K_2$-EDTA at pH5.5; 28% $K_2$-EDTA+0.5% α-amylase; and 0.5% α-amylase. In each instance, the amount of clean-up solution contacted with the sandstone core was 100 ml. After two hours, the leak-off volumes were observed; the retained permeability to kerosene was measured at the test temperature.

Upon preparing the breaker systems in the VES matrix, none of the fluids showed sedimentation or phase separation; however, when the pH of the VES in 28% $K_2$-EDTA) was increased to values higher than 11, a white waxy substance was observed. Apparently at this high pH, the EDTA-complex interferes with the surfactants and worm-like micellar structure in the VES system. The viscosity of the systems under study was measured using API Standard ramps at 180° F. (100 $sec^{-1}$ viscosity). The source of the viscoelastic behavior and the high low-shear viscosity of VES-based solutions is the wormlike micellar structure formed by the surfactants (either 4% KCl or 3% $NH_4Cl$). Addition of filtercake-breakers may affect this micellar structure, and hence also the the rheological behavior of the VES solutions. This can occur either through reaction of the additive with the VES-surfactant molecule or by interaction of the additive VES with the clear fraction micellar structure.

The results shall now be discussed. FIG. 1 is an overview of the viscosities measured for 5% VES-solutions with various additives. The values correspond to 100 s$^{-1}$ after shearing the sample at 100 s$^{-1}$ for 101 minutes. This viscosity is calculated from the API-ramps that were taken at that point. These data show for instance that VES viscosity (and probably the microscopic micellar structure) are not significantly affected by the addition of either EDTA or α-amylase, or by the addition of the two breakers together.

Figure 2:
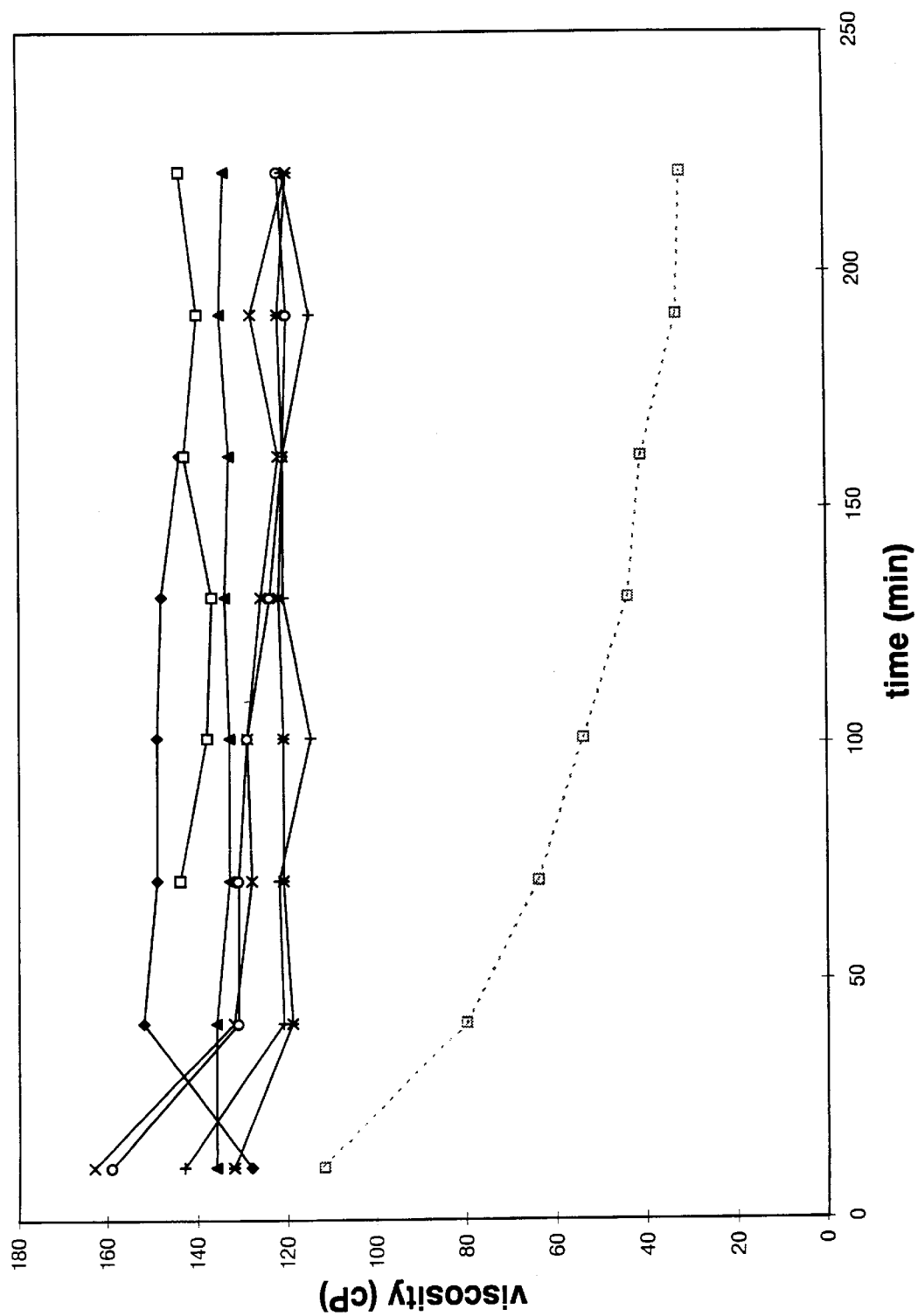
FIG. 2 shows the effect of various combinations of α-amylase and K2-EDTA on VES (5% by volume) rheology: 3% $NH_4Cl$ and 28% $K_2$-EDTA (diamonds); 4% KCl (open boxes); 4% KCl in 28% $K_2$-EDTA (triangles); 3% $NH_4Cl$ and 0.5% α-amylase and 28% $K_2$-EDTA (diagonal crosses with vertical lines); 3% $HN_4Cl$ in tap water (diagonal crosses); 3% $NH_4Cl$ and 0.5% α-amylase (open circles); 4% KCl and 0.5% α-amylase in tap water (vertical lines); 4% KCl and 0.5% α-amylase in 28% $K_2$-EDTA Right open boxes). These data show, for instance that the addition of α-amylase in a YES solution does not significantly affect VES-solution viscosity at 100 sec$^{-1}$, yet if α-amylase is added to a VES solution to which 28% $K_2$-EDTA and KCl are also added, then viscosity is significantly reduced—though not if $NH_4Cl$ is used instead of KCl.

FIG. 2 reports related data. There, the effect of the addition of starch-breaking enzyme α-amylase on VES rheology is shown. According to FIG. 2, addition of α-amylase to a VES-in-brine solution does not significantly affect the viscosity of VES at 100 sec$^{-1}$. Yet, when α-amylase is added to VES in EDTA/KCl brine, the viscosity is reduced considerably. It is striking that this effect does not occur if EDTA/NH$_4$Cl brine is used. Repetition of both tests gave similar results.

Figure 6:
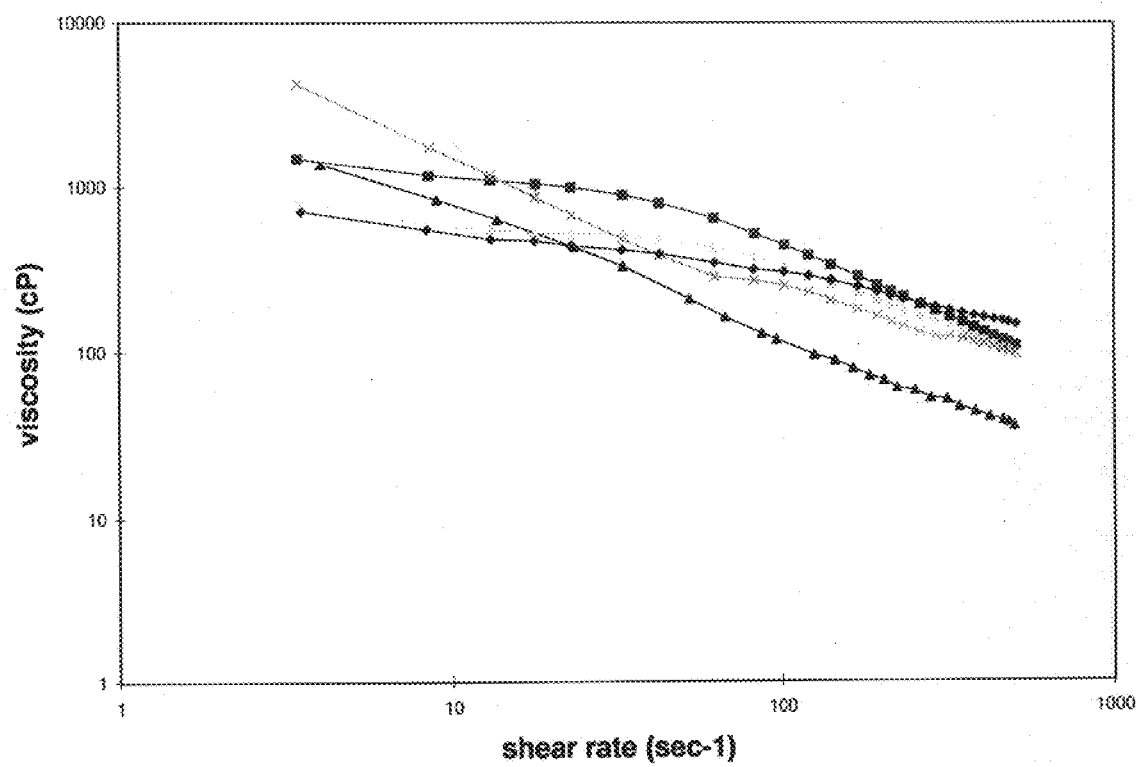
FIG. 6 shows the rheology (shear rate versus viscosity) of two different types of VES systems (VES and $VES_1$), a 28% $K_2$-EDTA/0.5% α-amylase system in 5% VES at 125° F. fight triangles) compared with similar systems, no α-amylase (crosses), 1.5% VES at 75° F. (plus $K_2$-EDTA/α-amylase) (dark triangles), 5% $VES_1$ at 140° F. (diamonds). These data show that the rheology of a different VES system is not significantly affected by the addition of $K_2$-EDTA/α-amylase.
Figure 7:
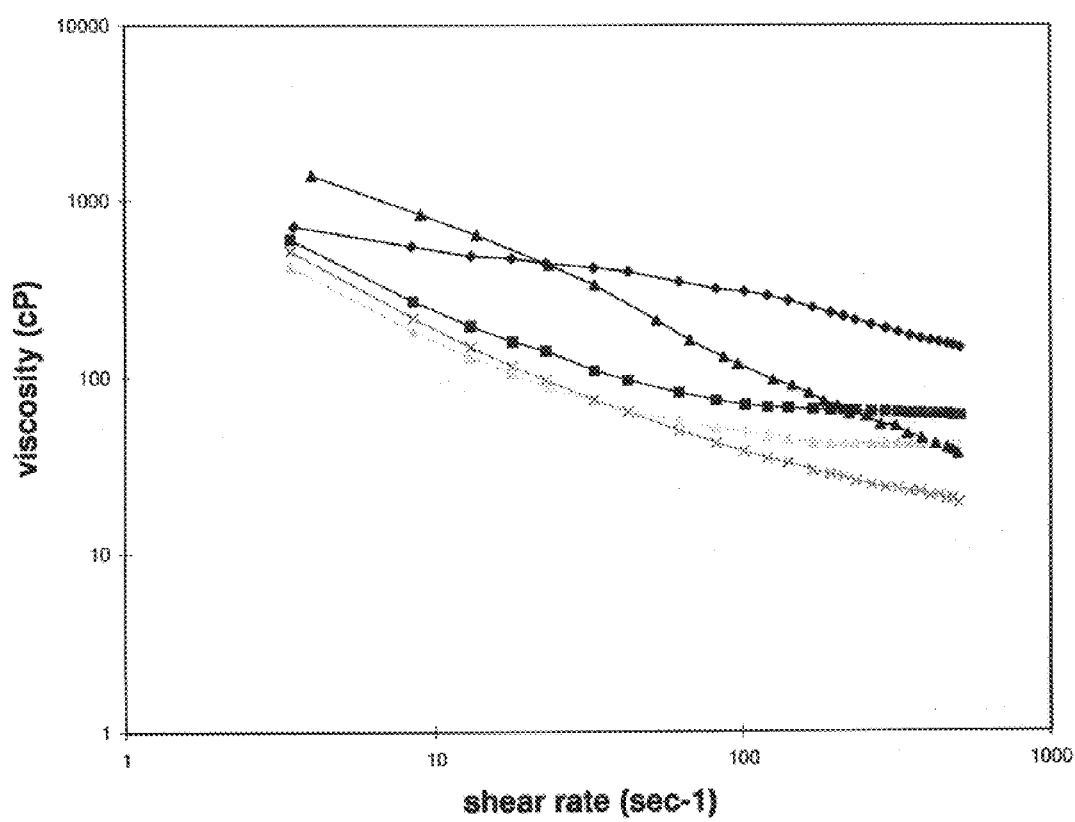
FIG. 7 is identical to FIG. 6 except that the system was tested at 200° F. instead of 125° F. These data show no significant difference in activity of the systems under study at 125 versus 200° F.

FIG. 6 shows the effect on the rheology of VES systems to which 28% K$_2$-EDTA and 4% KCl are added (at 125° F. if not specified). These data show that the rheology of VES is not significantly affected by the addition of either K$_2$-EDTA or α-amylase, or both. FIG. 7 presents similar data though at higher temperature. In addition what these two Figures also show is that both 5% VES (short-chain) VES at 140° F. and 1.5% (long-chain) VES at 75° F. are competent gravel pack carrier fluids. Hence, in accordance with the present Invention, it is now possible to formulate gravel pack carrier fluids containing filter cake breakers for 125 and 150° F., that have similar rheology.

Figure 8:
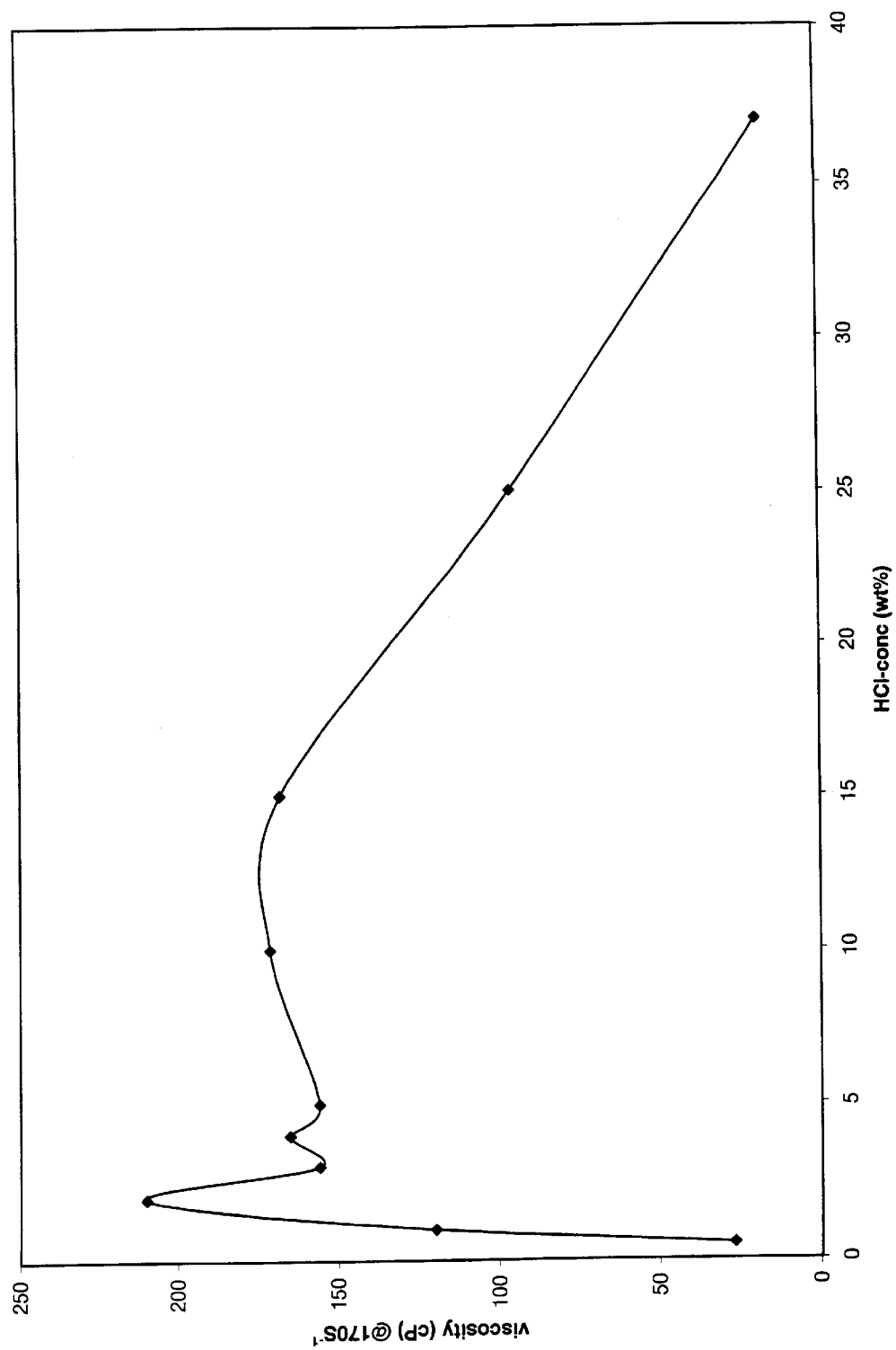
FIG. 8 shows the viscosity (at 170 s$^{-1}$) of a 3% VES solution at 80° F. as a function of HCl concentration. These data show that, above 15% HCl (between 15 and 25%) solution viscosity decreases, but below that, the VES-stability is not affected by the acid.

FIG. 8 shows the effect of varying HCl concentration on the viscosity of a 3% VES system at 80° F. As evidenced by these data, viscosity is barely affected from about 5% HCl to about 15% HCl, after which viscosity falls off significantly.

Figure 10:
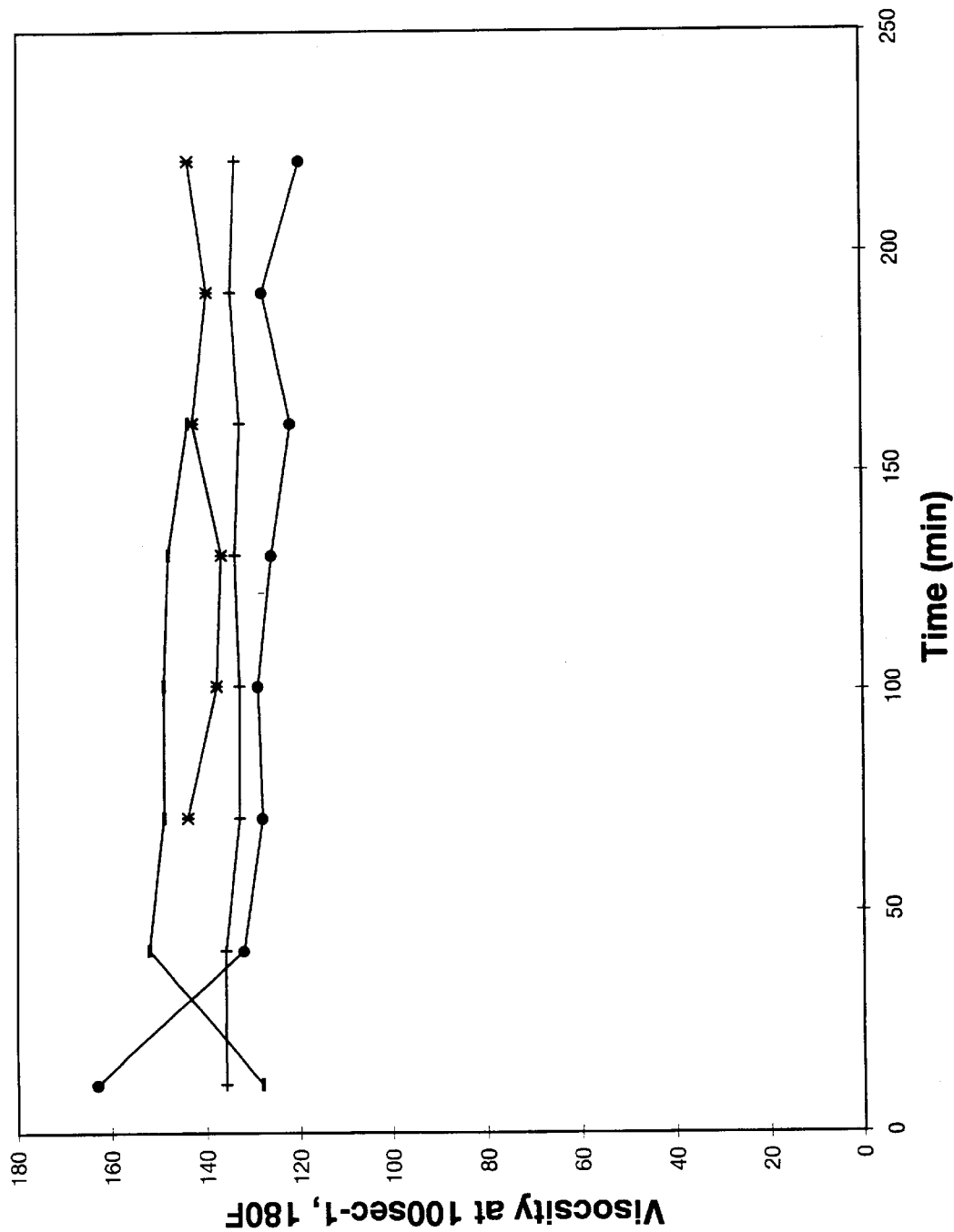
FIG. 10 compares the effect of different salts on the rheology of a 5% VES 27.3% $K_2$-EDTA system: 4% potassium chloride (no $K_2$-EDTA) (crosses); 3% ammonium chloride (circles) (no $K_2$-EDTA); 4% potassium chloride (vertical lines); 3% ammonium chloride (flat boxes). These data show that $K_2$-EDTA does not substantially affect the viscosity of the 5% VES system.

Finally, FIG. 10 compares the effect of different salts (sodium salicylate, KCl, and NH$_4$Cl) on the rheology of a 5% VES system. These data convincingly demonstrate that K$_2$-EDTA (at up to 28%, which is roughly the solubility limit of EDTA in water) does not substantially affect the viscosity of a 5% VES system. Additionally, these data show that neither KCl nor NH$_4$Cl affects the rheology of the 5% VES system; however, sodium salicylate, even at very low concentrations (0.5%) has a dramatic effect on VES viscosity when EDTA is present (an approximately 40% decrease in viscosity).

From these data, two sets of particularly preferred embodiments emerge. These are completion fluids having both α-amylase and EDTA with or without VES. Yet if VES is used as the matrix, then the preferred salt is NH$_4$Cl at about 3%. Thus, one particular preferred completion fluid of the present Invention contains: 5% VES, 0.5% α-amylase, and 28% K$_2$-EDTA, in a 4% NH$_4$Cl solution. Another particular preferred fluid is:, 0.5% (α-amylase, and 28% K$_2$-EDTA, in a 4% salt solution (the salt type is less critical if VES is not used).

Without intending to be bound by this suggested mechanism, we posit that the combination of chelating agent and enzyme (e.g., K$_2$-EDTA and α-amylase) operate in synergy to break filtercake comprised of starch and calcite. More particularly, the starch polymer and the calcite are arranged in a complex configuration, e.g., the polymer coating the calcite particles. Thus, a breaker that acts primarily upon the polymer (e.g., an enzyme) will simply degrade the particle coating, but leave the particles untouched. Similarly, a breaker that acts primarily upon the calcite particles will have difficulty reaching them due to the polymer coating—hence the observed synergistic activity of the enzyme+chelating agent combination fluid.

The goal of an ideal completion fluid is that it degrade the filtercake to the greatest extent possible while at the same time ensuring a high retained permeability. Thus, a completion fluid that resulted in maximum filtercake degradation but that left filtercake particles embedded in the wellbore, is ineffective, since retained permeability will be low. Therefore, the degradation must be even and complete—i.e., result in small particles that cannot plug the wellbore, but that can be removed in a circulating wash or can be produced with the hydrocarbon.

EXAMPLE 2

Breaker Activity in VES Systems

The previous Example adequately demonstrated that VES systems are stable—i.e., their viscosity is not substantially affected in the presence of the breakers of the present Invention (e.g., HCl, formic and acetic acid, enzymes, and chelating agents). This Example demonstrates that the VES matrix does not substantially affect the activity of the breakers—i.e., with respect to breaking filtercake.

Figure 3:
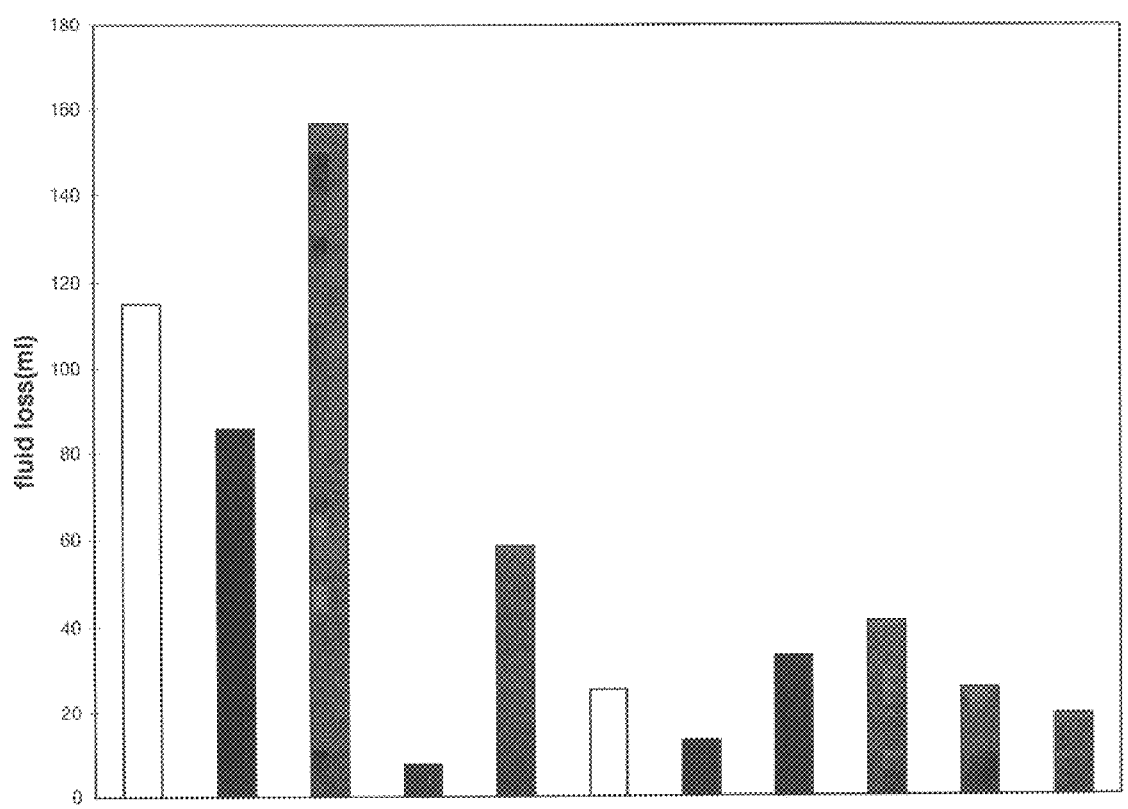
FIG. 3 shows the effect of VES (5%) on the cake-breaking activity of both enzyme and conventional oxidizer breakers. The white bars represent (from left to right): (1) no VES, 0.5% α-amylase, 4% KCl; (2) no VES, 1% ammonium persulfate, 4% KCl. The black bars represent: (1) no VES, 0.5% α-amylase, 4% KCl, (2) VES, 4% KCl; (3) VES 1% ammonium persulfate; (4) VES, 1% ammonium persulfate, 0.1% triethanolamine, 4% KCl. The gray bars represent: (1) VES, 0.5% α-amylase, 28% K2-EDTA, 4% KCl; (2) VES, 28% $K_2$-EDTA, 4% KCl; (3) VES, 1% ammonium persulfate, 28% K2-EDTA, 4% KCl; (4) VES, 5% (low temperature-optimized) ammonium persulfate, 28% $K_2$-EDTA, 4%; (5) VES, 5% encapsulated ammonium persulfate, 28% $K_2$-EDTA, 4% KCl. All assays were conducted at 150° F. These data show that VES impairs but does not entirely destroy cake-breaking activity.

FIG. 3 shows the effect of VES (5%) on the activity of both enzyme (α-amylase) and conventional oxidizer breakers (ammonium persulfate, dissolved and encapsulated). These data show that VES inhibits the activity of breakers of proven efficacy.

Figure 4:
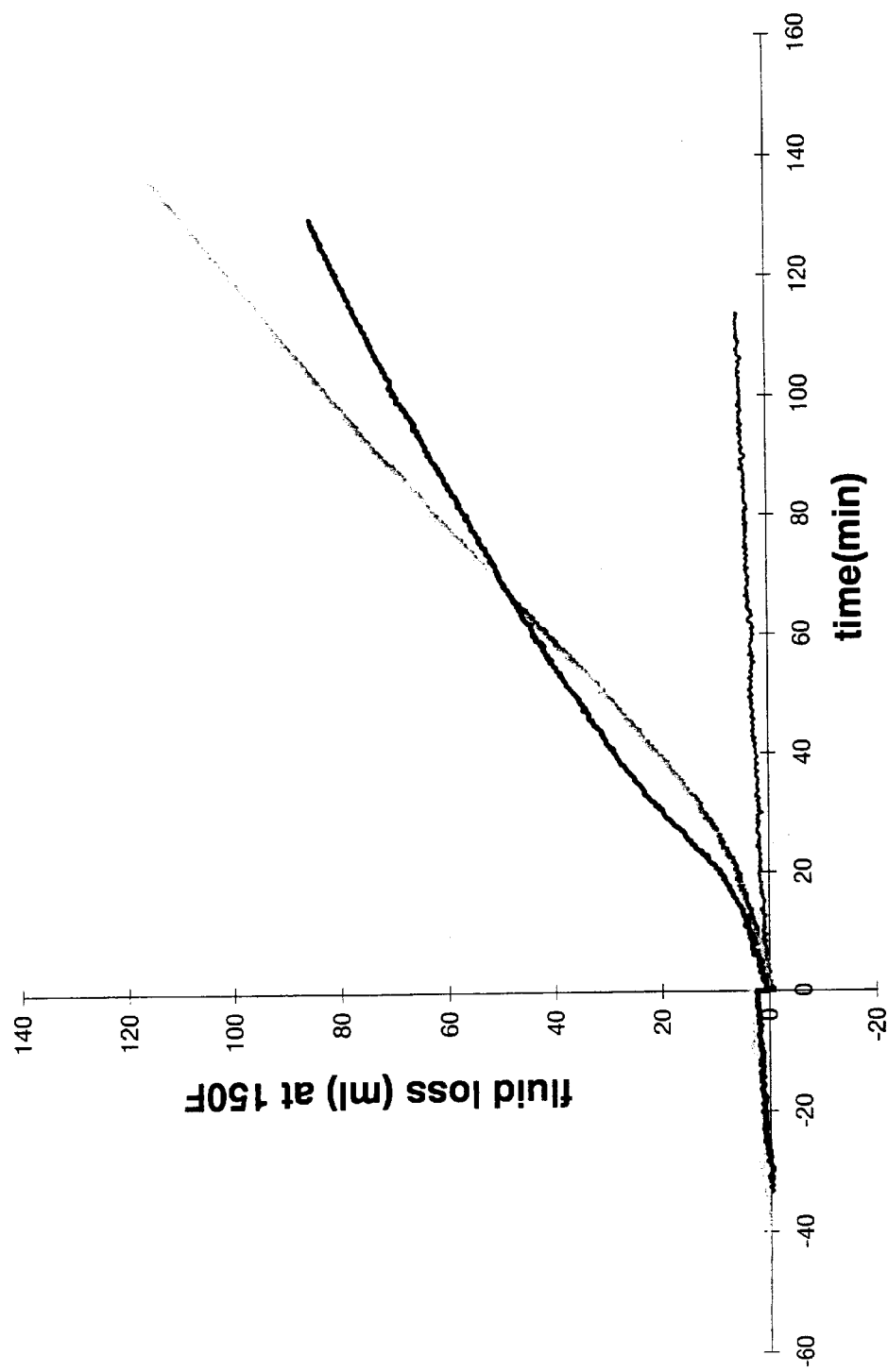
FIG. 4 shows the effect of VES (5%) on two breaker types α-amylase and ammonium persulfate), (1) 1% ammonium persulfate, no VES (thin gray line); 1% ammonium persulfate, VES (thin black line); (2) 0.5% α-amylase, no VES (thick gray line), 0.5% α-amylase, VES (thick black line). These data show that VES is compatible with these two breaker systems.

As evidenced by FIG. 4, the data presented in FIG. 3 must be qualified by an evaluation of the time-dependence of these systems. FIG. 4 shows that VES actually increases the activity of α-amylase over approximately the first 65 minutes of the test.

Figure 5:
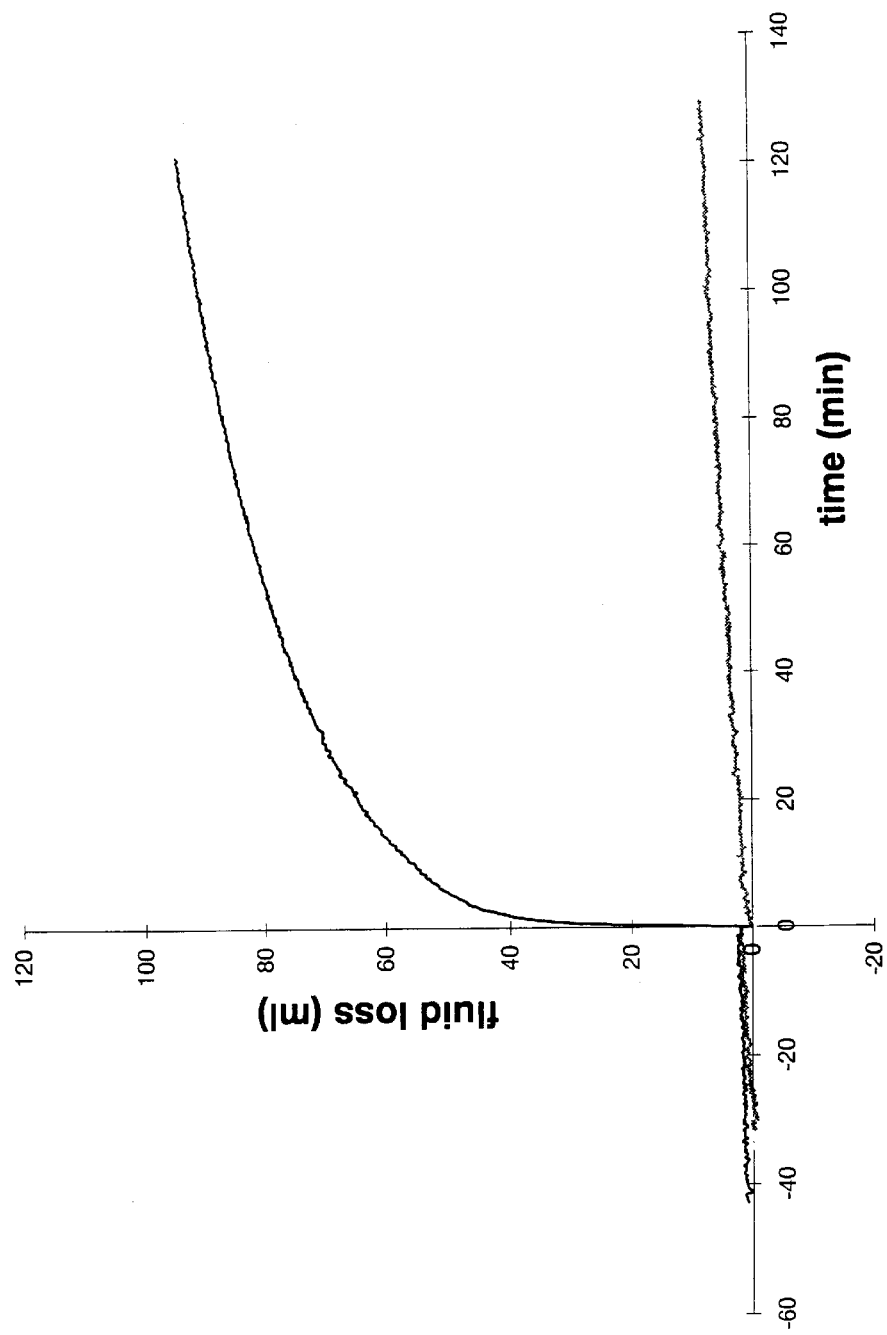
FIG. 5 shows the effect of VES on $K_2$-EDTA cake-breaking activity, 5% VES, 28% K2-EDTA Light gray line), 5% VES, no $K_2$-EDTA (dark gray line), no VES, 28% $K_2$-EDTA (black line). These data show that the presence of VES substantially affects $K_2$-EDTA activity.

FIG. 5 shows the results of an K$_2$-EDTA system (in the presence of 5% VES and without). These results show that VES does have a substantial effect on EDTA activity.

EXAMPLE 3

Performance of the Completion Fluids of the Present Invention

Having shown that the various breaking agents (e.g., acid, enzymes, and chelating agents) separately or in combination, are effective in VES solutions (as well in non-VES solutions) and having shown to what extent these agents are affected by the VES, we shall now demonstrate in more detail the superior performance of the completion fluids of the present Invention.

The purpose of this Example is to demonstrate that certain formulations of the present Invention exhibit superior filtercake removal—compared with conventional systems. The experimental protocol in this Example was carefully designed to simulate, as closely as possible, actual conditions in an exemplary water-wet, oil-saturated, sandstone reservoir.

Figure 9:
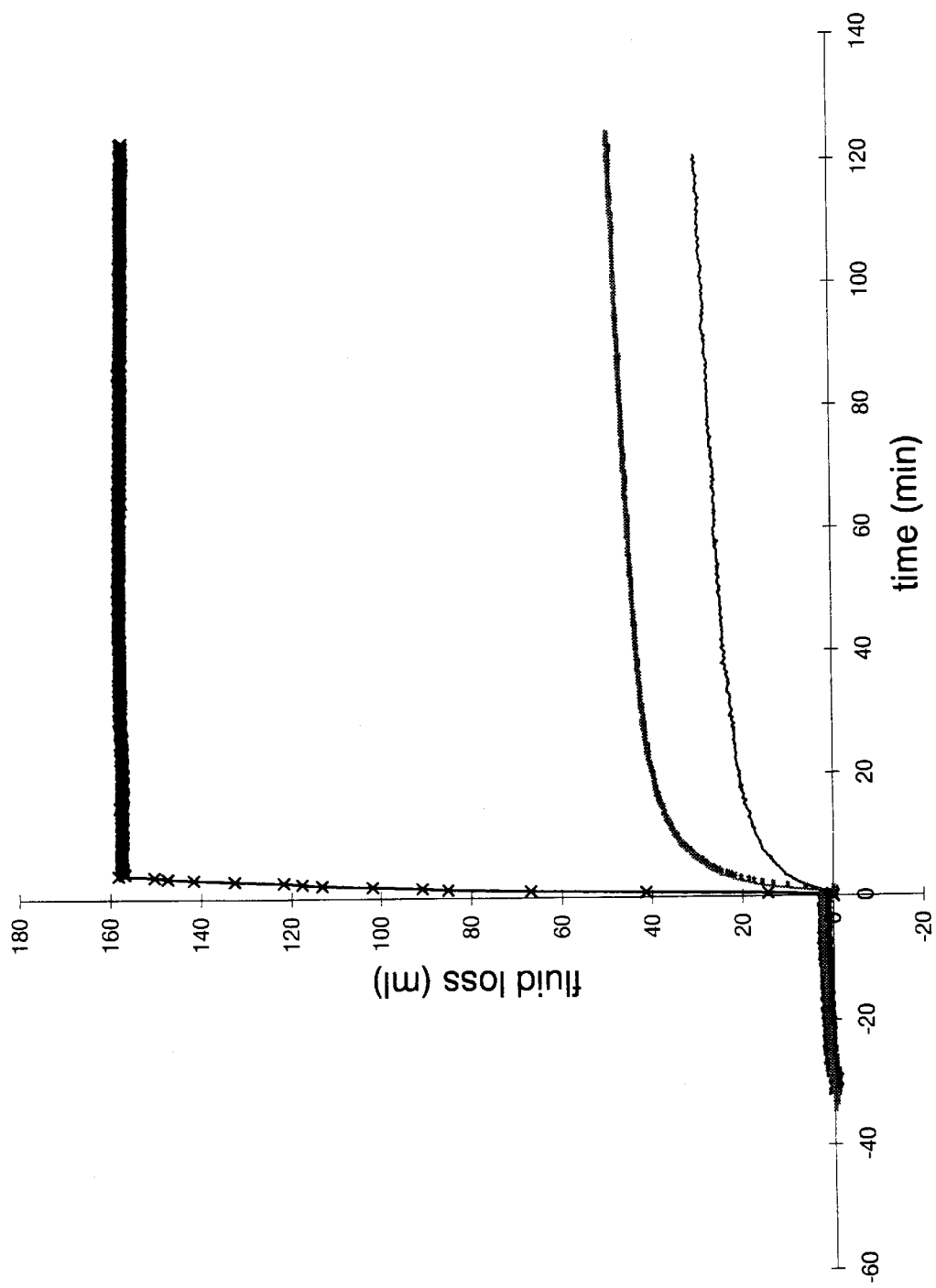
FIG. 9 compares the effect of α-amylase and ammonium persulfate in 5% VES/28% $K_2$-EDTA solutions, 0.5% α-amylase (black line with crosses), no polymer break (gray line), 1% ammonium persulfate (black line). These data show the superior activity of α-amylase over ammonium persulfate in a VES/$K_2$-EDTA system.

The data presented in FIG. 9 compares the effect of α-amylase versus an oxidizer breaker (ammonium persulfate) in a VES/K$_2$-EDTA system (5% VES, 28% K$_2$-EDTA, 4% KCl). These data show that an enzyme+ EDTA system is unquestionably superior to an oxidizer+ EDTA system. These data are surprising since, while the EDTA is directed to the calcite fraction of the filtercake, the oxidizer and α-amylase are directed to the polymer fraction. Therefore, both binary systems are "complete" in that they contain a breaker for each of the two fractions comprising the filtercake, hence one might expect a comparable filter-cake removal rates (or extent).

Figure 11:
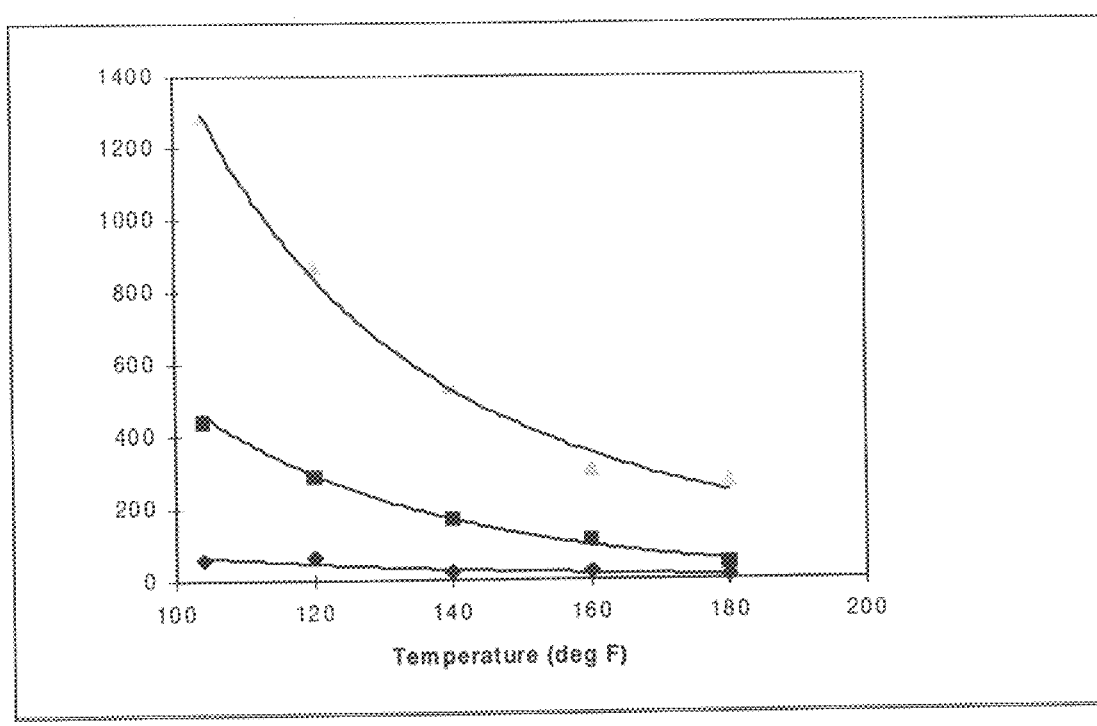
FIG. 11 shows a comparison of break times (filtercake degradation) for three different systems: 15% HCl (diamonds), 9% formic acid (squares), and 28% $K_2$-EDTA. These data show that the HCl system breaks the filtercake more rapidly that the other two systems.

FIG. 11 presents data that compares the activity (break times) of 15% HCl, formic acid, and 28% K$_2$-EDTA in 5%

VES, as a function of temperature. As evidenced by FIG. 11, the EDTA system out performs the acid systems by a substantial margin, particularly at lower temperatures.

Figure 12:
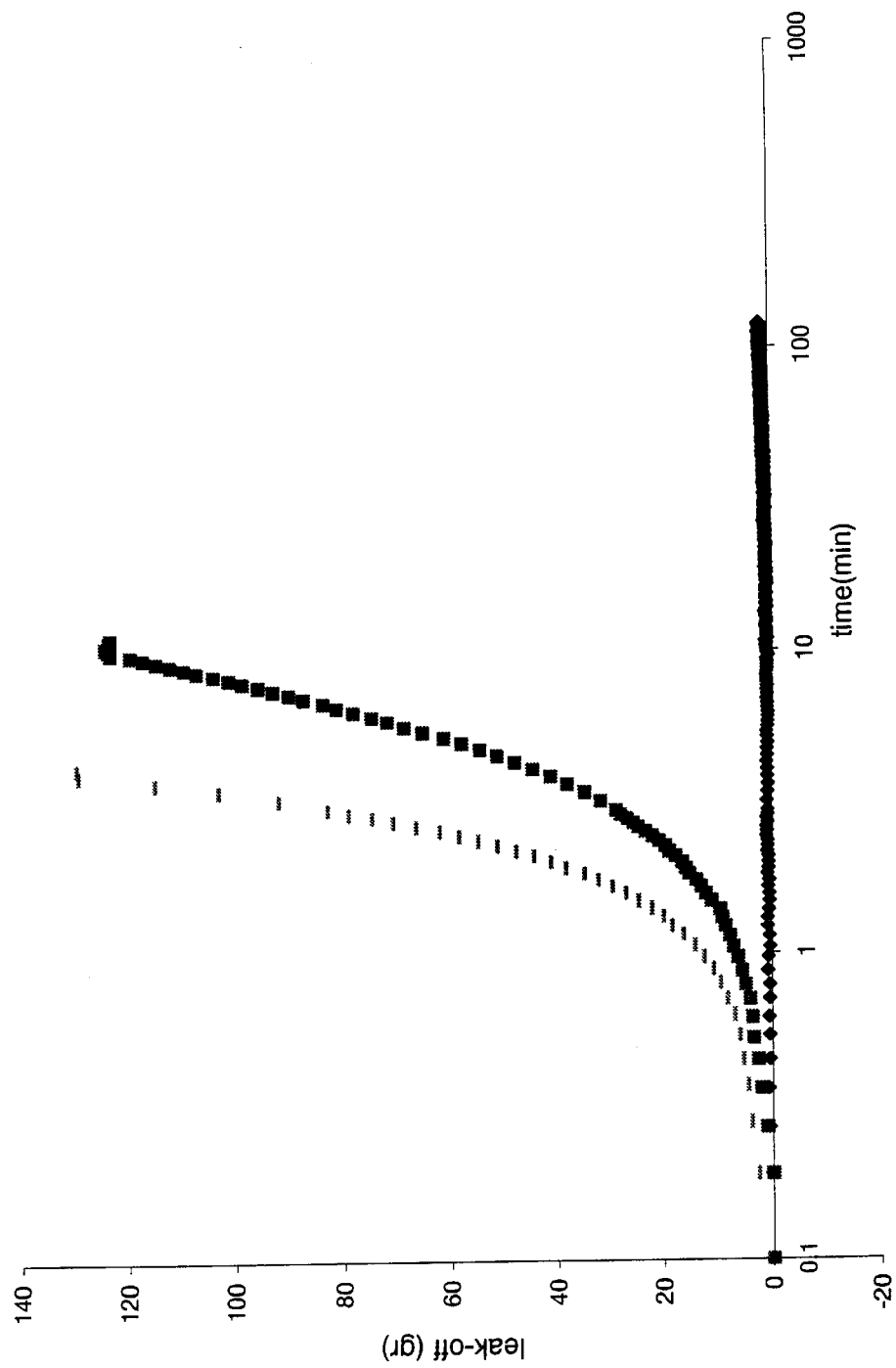
FIG. 12 shows the effect of α-amylase on a $K_2$-EDTA/ VES system on the system's cake-breaking activity. The systems shown are control/blank (diamonds), $K_2$-EDTA/ VES only (squares), and $K_2$-EDTA/VES with α-amylase. These data show that the addition of the enzyme substantially enhances leak-off (a proxy for filtercake degradation), and that this effect occurs very quickly (<1 minute).
Figure 13:
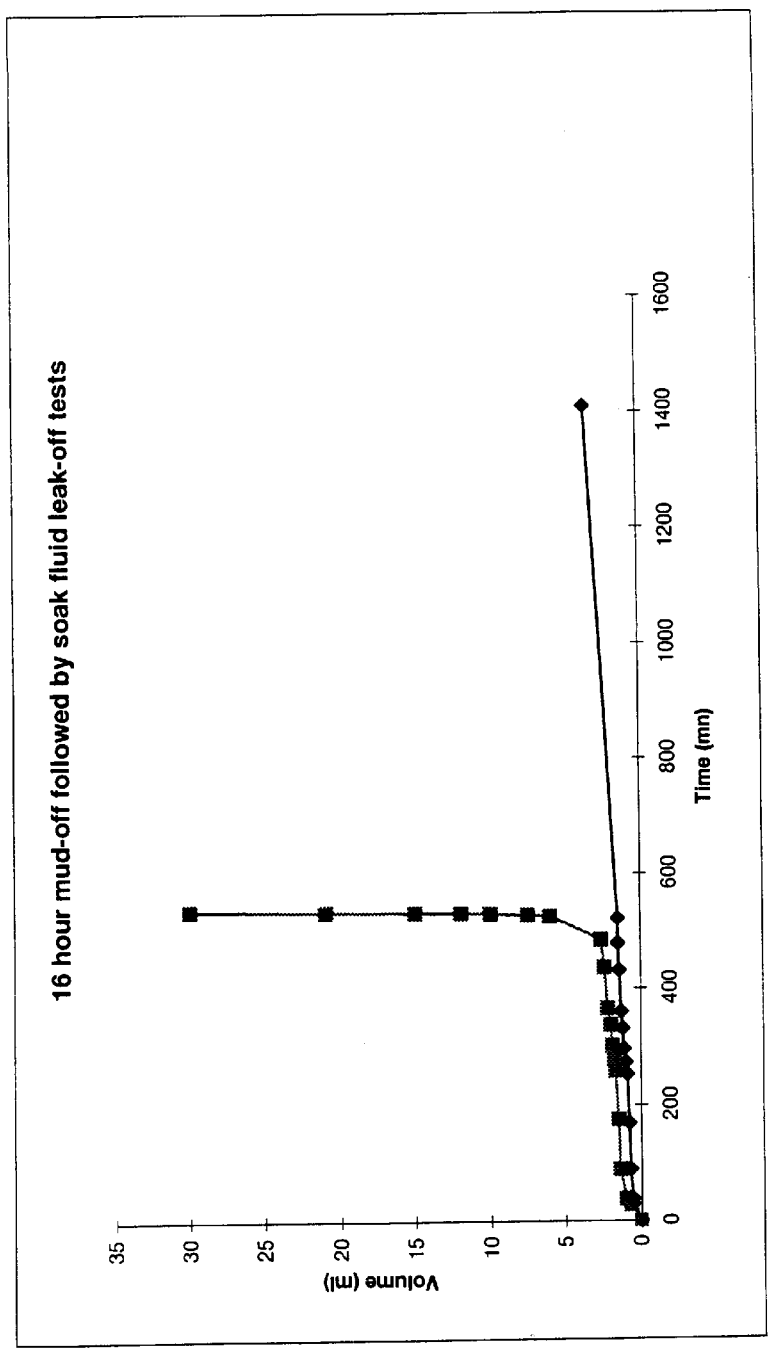
FIG. 13 shows a comparison of two systems with respect to their capacity to break filtercake. The two systems are $K_2$-EDTA only (diamonds) and $K_2$-EDTA, and α-amylase (squares). These data show that more complete break occurs with the $K_2$-EDTA/α-amylase system (after approximately 500 minutes).

FIGS. 12 and 13 compare the activity of an EDTA system versus an EDTA/α-amylase system, in VES (FIG. 12) and without VES (FIG. 13). A comparison of the two Figures shows that the EDTA-only system is actually enhanced in the presence of VES, though this effect is unobservable prior to about 90 minutes. FIG. 12 corroborates earlier data showing the superior performance of the chelating agent/enzyme system compared with chelating agent by itself. FIG. 12 also shows that this effect is very rapid—less than one minute).

Figure 14:
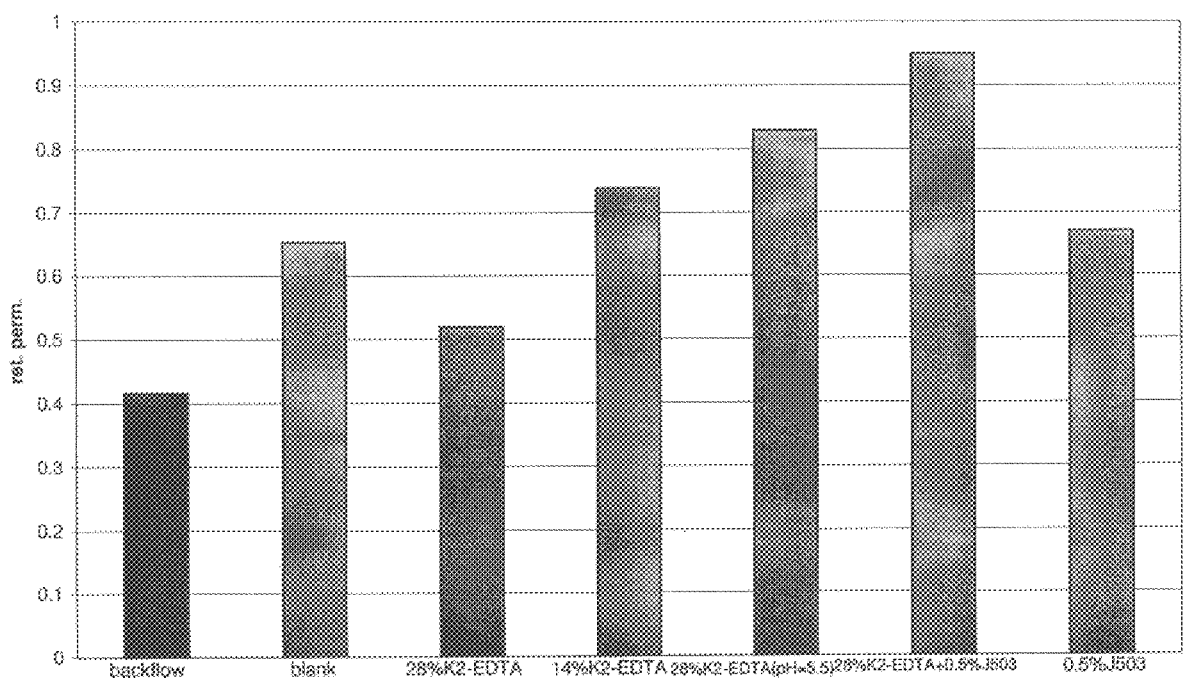
FIG. 14 compares retained permeability for a 5% VES system in 3% $NH_4Cl$ (2 hrs., 300 psi, 150° F.) upon addition of various breakers, from left to right: nothing, VES only, 28% $K_2$-EDTA only; 14% $K_2$-EDTA; 28% $K_2$-EDTA at pH 5.5; 28% $K_2$-EDTA+0.5 α-amylase; and 0.5% α-amylase. These data show that the $K_2$-EDTA+α-amylase system gives superior retained permeability.

The leak-off data of FIG. 14 is consonant with that presented in FIG. 12. Most significantly though, FIG. 14 shows that the EDTA/α-amylase system gives the highest retained permeability-over 90%, compared with the EDTA-only system which resulted in a retained permeability of just over 80%. Therefore, the VES/EDTA/α-amylase system of the present Invention is demonstrably superior to conventional clean-up formulations on both relevant axes of comparison: leak-off and retained permeability. Moreover, results presented earlier (e.g., FIG. 4 for α-amylase; FIG. 5 for EDTA) show that VES is a viable carrier fluid for the EDTA/α-amylase system. Similarly, as evidenced by the results presented in FIGS. 1 and 2, the EDTA/α-amylase system activity does not significantly affect the characteristics of the VES matrix (e.g., viscosity).

Finally, the skilled treatment designer will recognize that chelating agents other than EDTA are operable in fluid compositions of the present Invention. The relevant parameters for selection of the fluid are the calcite (or other mineral) dissolution constant (a thermodynamic parameter), the proton dissociation constants (also thermodynamic parameters), and kinetic parameters. The skilled treatment designer can infer the behavior of other chelating agents by comparing those parameters for EDTA with those for the chelating agent under consideration. A systematic study of the kinetics of calcite dissolution by various chelating agents (including EDTA, DTPA, and CDTA) is presented in C. N. Fredd and H. S. Fogler, The Influence of Chelating Agents on the Kinetics of Calcite Dissolution 204 J. Colliod Interface Sci. 187 (1998). This article is incorporated by reference in its entirety.

EXAMPLE 4

Specialized Applications

The fluids and techniques of the present Invention are quite general and are operable in a variety of settings. Since the problem of placement and uniform dissolution are present in virtually every instance, the fluids and techniques of the present Invention are readily applicable to any scenario in which it is desirable to remove filtercake from the wellbore or near-wellbore region in the formation, regardless of whether the filtercake was produced during drilling or during other post-drilling operations (e.g., fluid-loss control pill, gravel pack operation, fracturing, matrix acidizing, and so forth). The fluids and techniques of the present Invention are applicable in numerous different environments, including.

screen-only completions and gravel pack completions;
open hole and case hole;
vertical and highly deviated wells;
single-stage soak fluid or circulating fluid in which the treatment fluid (of the present Invention) also serves as a carrier fluid for, e.g., a gravel pack operation;

in conjunction with a gelling agent such as a viscoelastic surfactant (e.g., ClearFRAC™) or alone;

with a variety of clean-up tools and unconventional technologies (e.g., Mobil's Alternate Path Technology, see, e.g., L. G. Jones, et al., Gravel Packing Horizontal Wellbores With Leak-Off Using Shunts, SPE 38640, hereby incorporated by reference in its entirety); or in conjunction with other fluid additives (e.g., anti-corrosive agents) or dissolution components (e.g., an oxidizer).

One such specialized setting in which the fluids of the present Invention can be applied is a particular type of gravel pack operation known as "AllPAC" or Alternate Path technology. (As used herein, the term "gravel pack" includes treatments incorporating the AllPAC technology. This technology is described in a number of patents, each is assigned to Mobile, and licensed exclusively to Schlumberger: U.S. Pat. No. 5,560,427, Fracturing and Propping a Formation Using a Downhole Slurry Splitter (1996); U.S. Pat. No. 5,515,915, Well Screen Having Internal Shunt Tubes (1996); U.S. Pat. No. 5,419,394, Tools for Delivering Fluid to Spaced Levels in a Wellbore (1995); U.S. Pat. No. 5,417,284, Method for Fracturing and Propping a Formation (1995); U.S. Pat. No. 5,390,966, Single Connector for Shunt Conduits on Well Tool (1995); U.S. Pat. No. 5,333,688, Method and Apparatus for Gravel Packing of Wells (1994); U.S. Pat. No. 5,161,613, Apparatus for Treating Formations Using Alternate Flopaths (1992); U.S. Pat. No. 5,113,935, Gravel Packing of Wells (1992); U.S. Pat. No. 5,082,052, Apparatus for Gravel Packing Wells (1992); U.S. Pat. No. 4,945,991, Method for Gravel Packing Wells (1990). Each of these patents is incorporated by reference in its entirety.

The significance of the AllPAC technology to the fluids and techniques of the present Invention cannot be overemphasized. Without AllPAC, gravel packing with a viscous carrier fluid is very difficult, in some instances, virtually impossible. AllPAC screen is comprised of shunt tubes which permit the easy flow of viscous fluid through the screen annulus to its intended situs.

In addition, a thorough discussion or filtercake removal in conjunction with sand control operations, in open-hole horizontal wells is provided in C. Price-Smith, et. al., Open Hole Horizontal Well Cleanup in Sand Control Completions: State of the Art in Field Practice and Laboratory Development, SPE 50673 (1998). This article is incorporated by reference in its entirety.

The ALLPAC technology incorporates a novel gravel pack screen device which contains "shunt-tubes" or alternate flow paths, attached to the sides of the screen. These shunt tubes permit effective gravel packing by eliminating bridging (or more precisely, by letting the fluid flow around a bridged zone), thus even long horizontal sections can be gravel packed even with high fluid loss. Therefore, when the fluids of the present Invention are used in conjunction with the ALLPAC technology, a novel method is enabled. In this method, the filtercake is readily cleaned up during the gravel pack operation since fluid loss (leak-off) will not substantially interfere with the quality of the gravel pack. Thus rig time is substantially reduced by combining filtercake removal with gravel pack treatment.

Indeed, combined gravel pack/filtercake removal treatments the fluids of the present Invention incorporating the AllPAC technology provide a cost-effective means to complete a well. A yard test with a single shunt tube placed in side a slotted liner packed an entire length of 2,000 ft using the VES. During this test, it was found that 40/60 gravel (approx. 50 darcies) was sufficient to divert flow down the shunt tube. Again, leak off is not a concern, which is another substantial advantage of the AllPAC technology as it is exploited using the fluids and methods of the present Invention.

Thus having described the invention, we claim:

1. A well completion fluid for breaking filtercake comprising a chelating agent and an enzyme and a viscoelastic surfactant.

2. The well completion fluid of claim 1 wherein said viscoelastic surfactant is N-cis-13-docosenoic-N,N-bis(2-hydroxymethyl)-N-methyl ammonium chloride.

3. The well completion fluid of claim 1, wherein said viscoelastic surfactant is present in said fluid at a concentration between 0.5 and 7%.

4. The well completion fluid of claim 1 further comprising iso-propanol wherein said iso-propanol and said viscoelastic surfactant are present in said fluid in a ratio of about 1:4.

5. The well completion fluid of claim 1, wherein said chelating agent is selected from the selected from the group consisting of 1-hydroxyethylidene-1, 1-diphosphonic acid-1 (HEDP), aminotri(methylene phosphonic acid (ATMP), diethylenetriaminepentamethylenephosphonic acid (DTPMP), ethylenediemninetetraacetic acid (EDTA), cyclohexanediaminetetraacetic acid (CDTA), diethylenediaminepentaacetic acid (DTPA), and nitrilotriacetic acid (NTA).

6. The well completion fluid of claim 5, wherein said chelating agent is EDTA and is present in said fluid at a concentration between 5 and 28%.

7. The well completion fluid of claim 1 further comprising a salt.

8. The well completion fluid of claim 7, wherein said salt is selected from the group consisting of KCl and $NH_4Cl$.

9. The well completion fluid of claim 7, wherein said salt is present in said fluid at a concentration of between 3 and 5%.

10. A method for breaking filtercake in conjunction with a gravel pack operation comprising injecting into a well the well completion fluid as in claim 9.

11. The method of claim 10, further comprising circulating said well completion fluid through the well.

12. The method of claim 10, comprising the step of first injecting into said well a pre-wash fluid.

13. The method of claim 12 wherein said pre-wash fluid consists essentially of an anionic surfactant solution.

14. A single-stage method for breaking filtercake comprising injecting into a wellbore a fluid as in any of claim 9 and allowing said fluid is allowed to contact the wellbore.

15. The method of claim 12, wherein the fluid is allowed to contact the wellbore for 24 to 128 hours.

16. The well completion fluid of claim 3 wherein said enzyme is α-amylase and is present in said fluid at a concentration of about 0.5%.

* * * * *